(12) United States Patent
Schmid et al.

(10) Patent No.: US 10,589,205 B2
(45) Date of Patent: Mar. 17, 2020

(54) FILTER ELEMENT WITH PRE-SEPARATOR AND FILTER SYSTEM

(71) Applicant: MANN+HUMMEL GmbH, Ludwigsburg (DE)

(72) Inventors: Daniel Schmid, Sachsenheim (DE); Michael Maier, Reisbach (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 116 days.

(21) Appl. No.: 15/851,856

(22) Filed: Dec. 22, 2017

(65) Prior Publication Data

US 2018/0117514 A1 May 3, 2018

Related U.S. Application Data

(63) Continuation of application No. PCT/EP2016/060518, filed on May 11, 2016.

(30) Foreign Application Priority Data

Jun. 22, 2015 (DE) ........................ 10 2015 007 901

(51) Int. Cl.
*B01D 53/02* (2006.01)
*B01D 46/00* (2006.01)
*B01D 46/12* (2006.01)
*B01D 46/10* (2006.01)
(Continued)

(52) U.S. Cl.
CPC ..... *B01D 46/0036* (2013.01); *B01D 46/0005* (2013.01); *B01D 46/0023* (2013.01);
(Continued)

(58) Field of Classification Search
CPC .......... B01D 2253/102; B01D 2265/02; B01D 2265/04; B01D 2279/60; B01D 46/0005;
(Continued)

(56) References Cited

U.S. PATENT DOCUMENTS

| | | | |
|---|---|---|---|
| 5,730,770 | A | 3/1998 | Greisz |
| 6,039,779 | A | 3/2000 | Butz et al. |

(Continued)

FOREIGN PATENT DOCUMENTS

| | | |
|---|---|---|
| DE | 9405390 U1 | 8/1995 |
| DE | 19700340 A1 | 7/1998 |

(Continued)

*Primary Examiner* — Christopher P Jones
(74) *Attorney, Agent, or Firm* — James Hasselbeck

(57) ABSTRACT

A filter element for filtering a fluid has one or more filter bellows with a specified raw side and a specified clean side oppositely positioned relative to the specified raw side. The filter bellows has a filter medium that is folded along fold edges in a zigzag shape to folds, wherein the folds extend between oppositely positioned end edges of the at least one filter bellows, wherein the filter bellows has parallel extending end edge faces at oppositely positioned end faces. At least one pre-separator embodied as a flat mat is arranged at the raw side of the filter bellows. A frame is injection-molded from plastic material around the filter bellows and seals the end edge faces. The pre-separator is fastened to the raw side with fastening elements arranged at the frame. A filter system with a filter housing is provided with such a filter element.

11 Claims, 5 Drawing Sheets

(51) Int. Cl.
  *B01D 46/52* (2006.01)
  *B01D 53/04* (2006.01)
  *B60H 3/06* (2006.01)
  *F02M 35/024* (2006.01)

(52) U.S. Cl.
  CPC ............ *B01D 46/10* (2013.01); *B01D 46/12* (2013.01); *B01D 46/521* (2013.01); *B01D 53/04* (2013.01); *B60H 3/0616* (2013.01); *F02M 35/0245* (2013.01); *F02M 35/02416* (2013.01); *B01D 2253/102* (2013.01); *B01D 2265/02* (2013.01); *B01D 2265/04* (2013.01); *B01D 2279/60* (2013.01); *B60H 2003/065* (2013.01)

(58) Field of Classification Search
  CPC ............ B01D 46/0023; B01D 46/0036; B01D 46/10; B01D 46/12; B01D 46/521; B01D 53/04; B60H 2003/065; B60H 3/0616; F02M 35/02416; F02M 35/0245
  See application file for complete search history.

(56) References Cited

U.S. PATENT DOCUMENTS

| | | |
|---|---|---|
| 2013/0232932 A1 | 9/2013 | Jarrier |
| 2013/0298773 A1 | 11/2013 | Yamagishi et al. |

FOREIGN PATENT DOCUMENTS

| | | |
|---|---|---|
| DE | 102009041134 A1 | 3/2011 |
| DE | 102010005114 A1 | 7/2011 |

FILTER ELEMENT WITH PRE-SEPARATOR AND FILTER SYSTEM

CROSS-REFERENCE TO RELATED APPLICATIONS

This application is a continuation application of international application No. PCT/EP2016/060518 having an international filing date of 11 May 2016 and designating the United States, the international application claiming a priority date of 22 Jun. 2015, based on prior filed German patent application No. 10 2015 007 901.9, the entire contents of the aforesaid international application and the aforesaid German patent application being incorporated herein by reference.

TECHNICAL FIELD

The invention is in the field of filter elements for filtration of a gas such as air for separation of particles and contaminants from air. The filter may include a pre-separator element, in particular for use as an air filter of an internal combustion engine or as an air filter for an interior, in particular of a motor vehicle.

BACKGROUND OF THE INVENTION

In the prior art, rectangular filter elements, so-called flat filters, with a folded filter medium, i.e., a fold pack, are known. For stabilization purposes, these filter elements are, for example, glued at the end faces and/or longitudinal sides. Still, there is the risk that a filter element is bent or distorted in use. In this case, gaps and/or cracks can form. This can lead to significant leakages.

DE 10 2009 041 134 A1 discloses a filter element which comprises a folded filter medium with end faces and longitudinal sides. In this context, the filter medium comprises folds with fold valleys and fold peaks. A fastening device with adhesive means is correlated with the filter medium. The fastening device is designed as a profile member to be inserted into the folds. The insertable profile member effects a terminal fold stabilization that stabilizes the filter element against distortions and deformations.

The arrangement of the adhesive means on the profile member has the effect that the filter element can be gripped in the area of a relatively stiff and stable profile member when it is to be exchanged. In this way, deformations and distortions of the filter element are also avoided. Accordingly, the profile member provides a designated engagement area that is to be gripped for releasing the filter element by the person performing mounting. The fastening device comprises two legs wherein the legs project away from a side of a functional surface that is facing away from the adhesive means. A functional surface permits the arrangement of adhesive means on the profile member. Due to two legs, the profile member is designed like a bracket to receive therebetween one or several folds. The legs are elastically deformable.

SUMMARY OF THE INVENTION

It is an object of the invention to provide a filter element with a pre-separator for filtering a fluid that is of a modular design and is manufacturable in a simple and inexpensive way.

A further object is to provide a filter system for filtering a fluid for receiving such an exchangeable filter element with a pre-separator that is of a modular design and is manufacturable in a simple and inexpensive way.

The aforementioned object is solved according to an aspect of the invention by a filter element that comprises at least one filter bellows and at least one pre-separator, wherein the filter bellows is injection-molded around with plastic material in the form of a frame and wherein the pre-separator is fastened by fastening elements arranged on the frame.

Beneficial configurations and advantages of the invention result from the additional claims, the description, and the drawing.

A filter element for filtering a fluid is proposed, in particular for use as an air filter of an internal combustion engine or as an air filter for an interior, in particular, of a motor vehicle, that comprises at least one filter bellows, with a specified raw side and a specified clean side positioned opposite thereto, of a filter medium that is folded along fold edges in a zigzag shape to folds, which extend respectively between oppositely positioned end edges of the filter bellows, and wherein the filter bellows comprises on oppositely positioned end faces parallel extending end edge faces. Furthermore, the filter element comprises at least one pre-separator which is embodied as a flat mat and is arranged at the raw side of the filter bellows. In this context, the filter bellows is injection-molded around with plastic material in the form of a frame so that the end edge faces are sealed. Furthermore, the pre-separator is fastened with fastening elements arranged on the frame. Raw side and clean side of the filter bellows can be, for example, of an areal design so that the filter bellows is embodied in the form of a planar plate.

According to the invention, one or several filter bellows are injection-molded around in an injection mold with a plastic material so that the at least one filter bellows is securely fixed and held in a kind of frame. The frame seals in this context expediently the end edge faces of the filter bellows in that the end edges of the filter bellows are also embedded by injection molding. End faces of the filter bellows can be embedded by injection molding also. Alternatively, they can however also remain open. A circumferentially extending end face of the frame is expediently provided with a seal for sealing the filter element when in use in a filter housing. At an oppositely positioned side of the frame, fastening elements are arranged on which a pre-separator, for example, in the form of a nonwoven mat, can be attached. In case of large-surface area filter elements, side faces of the frame can comprise reinforcement ribs for reinforcement. Transverse across the surface of the frame, stays for additional reinforcement can be arranged also. When several filter bellows are arranged adjacent to each other and embedded by injection molding, end edge seals for sealing the end edge faces are also expediently arranged in the interior of the frame across the length of the frame parallel to the outer surfaces of the end edge seals of the externally positioned filter bellows and additionally reinforce the frame and the filter element in this way.

Injection molding around the filter bellows with plastic material has several advantages. On the one hand, a stable frame is provided in this way in order to mechanically secure the filter bellows, to stabilize it, and to design it so as to be able to be manipulated for assembly. On the other hand, the end edge faces are sealed thereby so that the filter bellows is thus suitable for use in a filter system.

Filter elements that are injection-molded around by plastic material are embodied without pre-separator in the prior art. For improving the filtration values and for protecting the actual filter medium from coarse particles, water and/or snow, a pre-separator is often applied in conventional cellulose filter elements. This pre-separator according to the solution of the invention can also be applied in case of filter elements that are injection molded around with plastic material. This solution according to the invention results in an improved protection of the filter medium as well as an improvement of the filtration in case of filter elements that are injection-molded around by plastic material in that the actual filter medium of the filter bellows is not loaded and/or clogged with coarse dirt particles.

Advantageously, the frame can thus effect a lateral sealing action of the end edge faces. The side faces of the frame are expediently employed as end edge seals in that the end edges of the filter bellows are injection-molded around by the plastic material and are thus embedded in the side faces of the frame. In this way, a sealing action of the end edge faces is achieved. In case of several filter bellows, arranged adjacent to each other, the end edge seals can be arranged as inwardly positioned sealing surfaces of the frame parallel to the outer side faces of the frame.

According to an advantageous embodiment, the fastening elements can be formed as one piece together with the frame. The fastening elements for the pre-separator can be applied separately to the frame. It is however advantageous when the fastening elements are produced as one piece together with the frame in that they are also provided and manufactured during the injection molding process. In this way, the fastening elements can be produced in one working step and with the same material as the frame so that the manufacturing costs of the filter element can be beneficially designed.

According to a further advantageous embodiment, the fastening elements can be embodied as part of a hook and loop fastener, in particular as hook and loop fastener hooks. Such fastening elements can be typically produced also in an injection mold so that they can be produced together with the frame in an injection molding process. According to the current prior art, pre-separators are secured by means of adhesive beads, beads of hot melts, or similar means on a filter element. In case of filter elements injection-molded around by plastic material and plastic material frames, a hook and loop fastener structure can be incorporated at an end face of the frame and serves for attachment of pre-separators such as, for example, nonwovens, activated carbon media, or similar media. The hook and loop fastener structure can be directly produced in one step when injection molding the plastic part. No additional working steps, process steps, and no additional materials such as adhesives are required. The pre-separator, for example, in the form of a nonwoven, can be automatically placed during manufacture onto the filter element/the plastic frame. Due to the hook and loop fastener structure, a very good securing action is ensured. Advantages that result from such a manufacture of the fastening elements are, for example, cost advantages, quality advantages, processing time minimization. Alternatively, the hook and loop fastener hooks can be glued to the frame. In particular, the frame can be provided with adhesive strips that comprise hook and loop fastener hooks on the side facing away from the adhesive layer.

According to a further advantageous embodiment, the pre-separator can be provided for common exchange together with the filter element. When the pre-separator is connected to the filter element in the form of its frame by means of the fastening elements, it can then be exchanged also together with the entire filter element. The pre-separator then must not be separately handled. Alternatively, it is however also possible to remove the pre-separator after removal of the filter element from the latter, to clean it, and to reinsert it together with the same filter element or with a different filter element. Accordingly, a common handling together with the filter element is possible and expedient, but it is also possible indeed to continue to use the pre-separator separately, in particular when it is attached by means of a hook and loop fastener to the frame.

According to further advantageous embodiment, as a pre-separator an activated carbon medium can be provided. Activated carbon media are also existing as a flexible mat which is beneficially attachable to a hook and loop fastener structure attached to the frame of the filter element and able to be manipulated. In this way, an activated carbon medium can also be exchanged together with the filter element and requires no separate holding means in a filter system.

According to a further advantageous embodiment, the frame can be comprised of the same material as the filter medium. Instead of cellulose, a completely synthetic material such as, for example, polyester can be used as filter medium. In this case, it is also possible to injection-mold the frame of the same material. In this way, a better connection of frame and filter bellows/filter medium results since the same material in this case produces a fixed material-fused connection, such as a weld connection.

According to a further advantageous embodiment, on an end face of the frame a circumferentially extending seal can be provided. Such a seal of the filter element is expedient when in use in a filter housing in order to ensure a reliable separation of raw side and clean side of a filter system, as it is advantageous for a reliable filtering process over a corresponding service life of the filter system.

According to a further advantageous embodiment, at least one reinforcement stay can be provided in the frame transverse to the folds. In case of greater areal filter elements, the use of reinforcement stays is advantageous for reasons of torsional stiffness in order to ensure also a reliable sealing action across the service life of the filter element. Such a reinforcement stay can be provided in addition to the side faces of the frame in the injection molding tool. However, when employing several adjacently arranged filter bellows that are injection-molded around by the frame, it is also possible to embody the inner sealing action of the end edge faces as reinforcement stay so that a corresponding stability of the filter element is achieved in this way.

According to a further aspect, the invention concerns a filter system for filtering a fluid with a filter element as described above. In this context, the filter element is exchangeably arranged (i.e: designed to be easily removable and replaceable as needed in servicing) in a filter housing of the filter system and provides a filter bellows and a pre-separator to be exchanged together. The filter bellows is injection-molded around with plastic material in the form of a frame so that the end edge faces are sealed. The pre-separator is fastened to the frame with fastening elements arranged at the frame.

According to the invention, one or several filter bellows are injection-molded around in an injection mold with plastic material so that the at least one filter bellows is securely fixed and held in a kind of frame. The frame seals in this context expediently the end edge faces of the filter bellows in that the end edges of the filter bellows are also embedded by injection molding. The end faces of the filter bellows can also be embedded by injection molding. Alternatively, they can however also be open. The circumferentially extending end face of the frame is expediently provided with a seal for sealing the filter element during use in the filter housing. On an opposite side of the frame, fastening elements are arranged to which a pre-separator, for example, in the form of a nonwoven mat, can be attached. In case of large-surface area filter elements, side faces of the frame can comprise reinforcement ribs for reinforcement. Transverse across the surface of the frame, stays for additional reinforcement can be arranged also. When several filter bellows are arranged adjacent to each other and embedded by injection molding, end edge seals for sealing the end edge faces are also expediently arranged in the interior of the frame across the length of the frame parallel to the outer surfaces of the end edge seals of the externally positioned filter bellows and additionally reinforce the frame and the filter element in this way.

According to further advantageous embodiment, the fastening elements can be formed as one piece together with the frame. The fastening elements for the pre-separator can be applied separately to the frame. It is however advantageous when the fastening elements are produced as one piece together with the frame in that they are also provided and manufactured during the injection molding process. Accordingly, the fastening elements can be manufactured in one working step and with the same material as the frame so that the manufacturing costs of the filter element can be beneficially designed.

According to a further advantageous embodiment, the fastening elements can be embodied as a part of a hook and loop fastener, in particular as hook and loop fastener hooks. Such fastening elements can be typically produced also in an injection mold so that they can be produced in an injection molding process together with the frame. According to the current prior art, pre-separators are fixed by adhesive beads, beads of hot melts, or similar means on a filter element. In filter elements that are injection-molded around by plastic material and plastic material frames on an end face of the frame, a hook and loop fastener structure can be incorporated which serves for fastening pre-separators such as nonwovens, activated carbon media, or similar media. The hook and loop fastener structure can be directly produced in one step during injection molding of the plastic part. No additional working steps, process steps, and no additional materials such as adhesives are required. The pre-separator, for example in the form of a nonwoven, can be automatically placed during manufacture onto the filter element/the plastic frame. Due to the hook and loop fastener structure, very good adhesion is ensured. Advantages that result from such a manufacture of the fastening elements are, for example, cost advantages, quality advantages, processing time minimization.

The described filter system can be used advantageously as air filter, in particular as an air filter of an internal combustion engine or as an air filter for an interior, in particular of a motor vehicle.

BRIEF DESCRIPTION OF THE DRAWINGS

Further advantages result from the following drawing description. In the drawings, embodiments of the invention are illustrated. The drawings, the description, and the claims contain numerous features in combination. A person of skill in the art will expediently also consider the features individually and combine them to other meaningful combinations.

DETAILED DESCRIPTION

Figure 1:
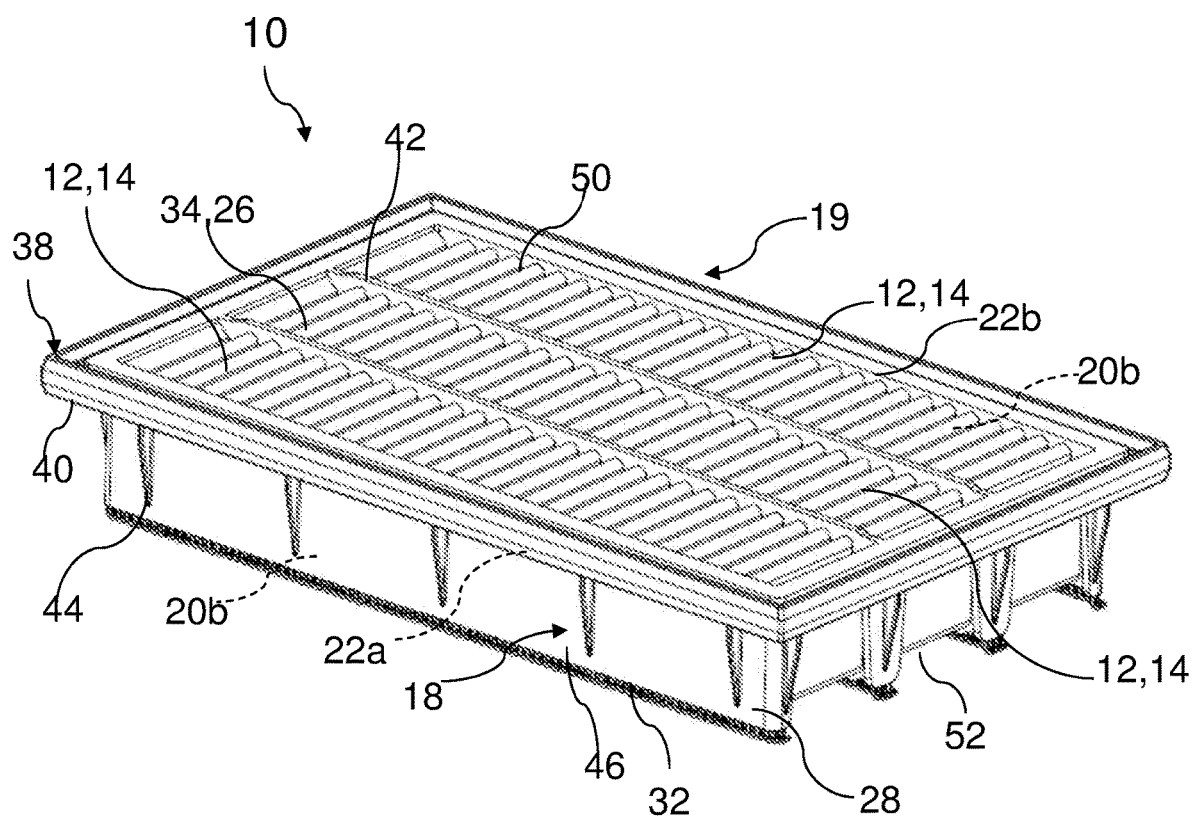
FIG. 1 shows an isometric illustration of a filter element without pre-separator with filter bellows injection-molded around with a frame according to an embodiment of the invention.

In the Figures, same or same-type components are identified with same reference characters. The Figures show only examples and are not to be understood as limiting.

FIG. 1 shows an isometric illustration of a filter element 10 without mounted pre-separator (30 in FIG. 4) with filter bellows 12 injection-molded around by a frame 28 according to an embodiment of the invention. The filter element 10 for filtering a fluid comprises in FIG. 1 a filter bellows 12 (alternative: three filter bellows) with a specified raw side 52 and a specified clean side 50, oppositely positioned thereto, of a filter medium 14, which is folded along fold edges 26 in a zigzag shape to folds 34 that extend between oppositely positioned end edges 22a, 22b of the filter bellows 12, respectively, and the filter bellows has parallel extending end edge faces 20a, 20b on oppositely positioned end faces 18, 19, respectively. The filter bellows 12 is injection-molded around by plastic material in the form of a frame 28 so that the end edge faces 20a, 20b are sealed. The pre-separator (30 in FIG. 4) can be attached by fastening elements 32 arranged at the frame 28; the pre-separator is not illustrated in FIG. 1. The frame 28 effects a lateral sealing action of the end edge faces 20a, 20b. In the frame 28, transverse to the folds 34, reinforcement stays 42 are provided which at the same time serve as sealing means of the end edge faces 20a, 20b of the individual filter bellows 12. The frame 28 can be expediently comprised of the same material as the filter medium 14 in order to achieve thus a material-fused connection between frame 28 and filter bellows 12, such as by welding.

The fastening elements 32 are formed as one piece together with the frame 28, i.e., expediently have been produced together with the frame 28 in an injection molding process. The fastening elements 32 can also be formed only partially. They are seated in particular at the bottom side of the side faces 46 and reinforcement stays 42 of the frame 28 which at the same time provide the sealing action of the end edge faces 20a, 20b of the filter bellows 12.

At the end face 38 of the frame 28, a circumferentially extending seal 40 is provided which is serving for separation of the raw side 52 from the clean side 50 when in use in a filter housing 108. The seal 40 can be injection-molded in a two-component process to the frame 28. It can also be produced as a shaped seal and, after production of the frame 28, can be pressed onto it.

Figure 2:
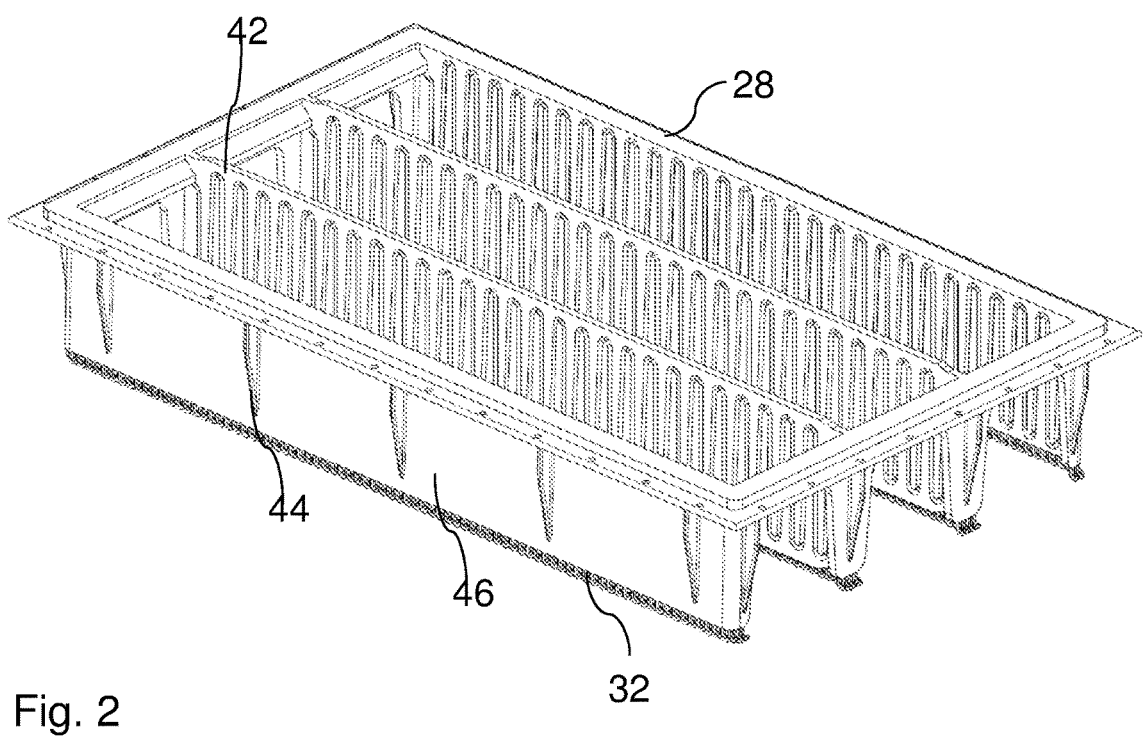
FIG. 2 shows an isometric illustration of the frame without filter bellows according to the embodiment in FIG. 1.

In FIG. 2 an isometric illustration of the frame 28 without filter bellows 12 according to the embodiment in FIG. 1 is illustrated. The frame 28 is shown as a skeleton for the filter bellows 12. In side faces 46 and reinforcement stays 42 the negative impressions of the end edges 22a, 22b of the filter bellows 12 can be seen since they are embedded in the plastic material and a lateral sealing action of the filter bellows 12 is achieved in this way. The side faces 46 comprise reinforcement ribs 44 for reinforcement of the entire frame 28. On the bottom side of the side faces 46 and reinforcement stays 42, the fastening elements 32 for the attachment of the pre-separator 30 are arranged.

Figure 3:
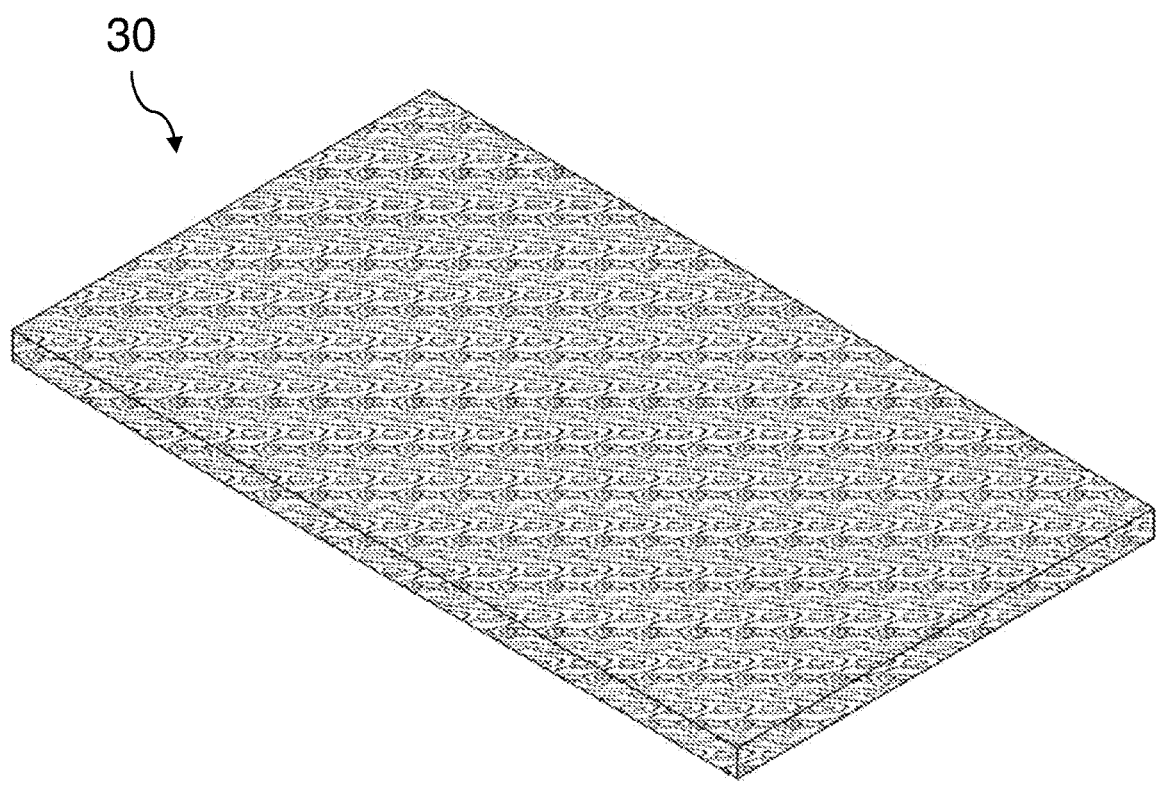
FIG. 3 shows an isometric illustration of a pre-separator according to an embodiment of the invention in the form of a flat mat.

FIG. 3 shows an isometric illustration of a pre-separator 30 according to an embodiment of the invention in the form of a flat mat. In FIG. 1, the filter element 10 according to the invention comprises such a pre-separator 30 which is formed as a flat mat and is arranged on the raw side 52 of the filter bellows 12. The pre-separator 30 is provided for common exchange together with the filter element 10. The pre-separator 30, after removal of the filter element 10 from the filter housing 108, can be removed from the frame 28 in order to be cleaned or to be reused with another filter element 10. The filter element 10 can also be provided with a new pre-separator 30 in order to thus be reused again. As a pre-separator 30, an activated carbon medium can be provided also.

Figure 4:
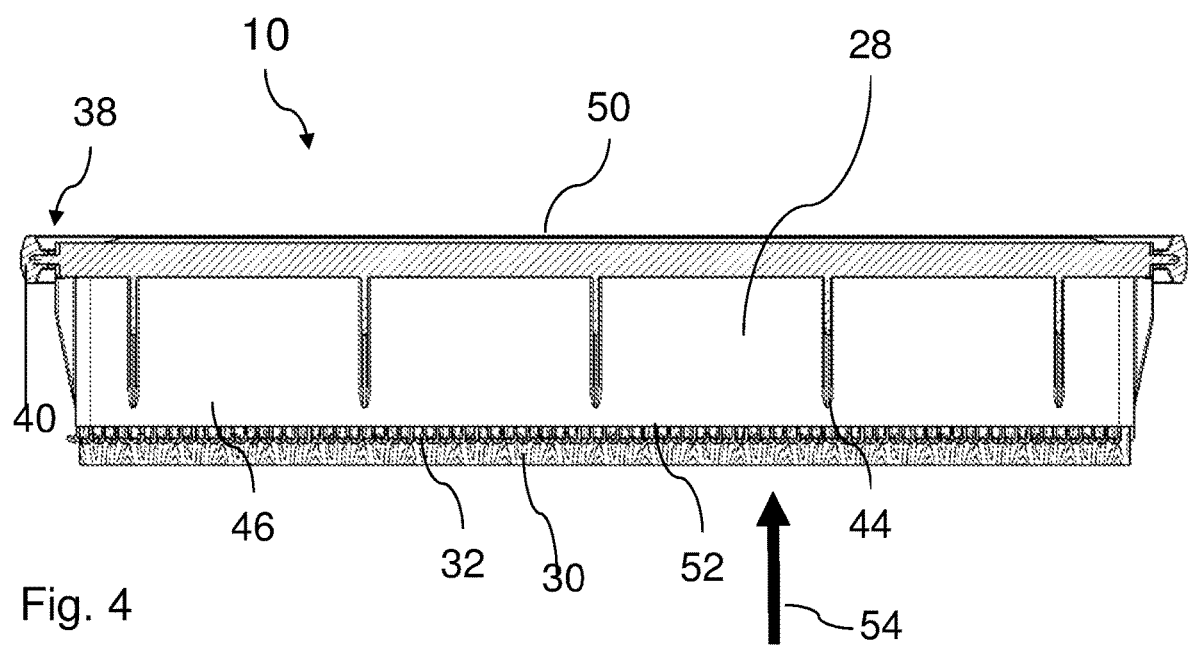
FIG. 4 is a side view of a filter element with pre-separator according to an embodiment of the invention.

In FIG. 4, a side view of a filter element 10 with pre-separator 30 according to an embodiment of the invention can be seen. The pre-separator 30 is attached to the fastening elements 32 which are arranged at the bottom side of the side faces 46 and reinforcement stays (42 in FIG. 1) corresponding to the raw side 52 of the filter element 10. The flow direction 54 of the filter element 10 is indicated by an arrow.

On a circumferentially extending end face 38 of the frame 28, the seal 40 is arranged which serves for sealing between raw side 52 and clean side 50 upon use in the filter housing 108.

Figure 5:
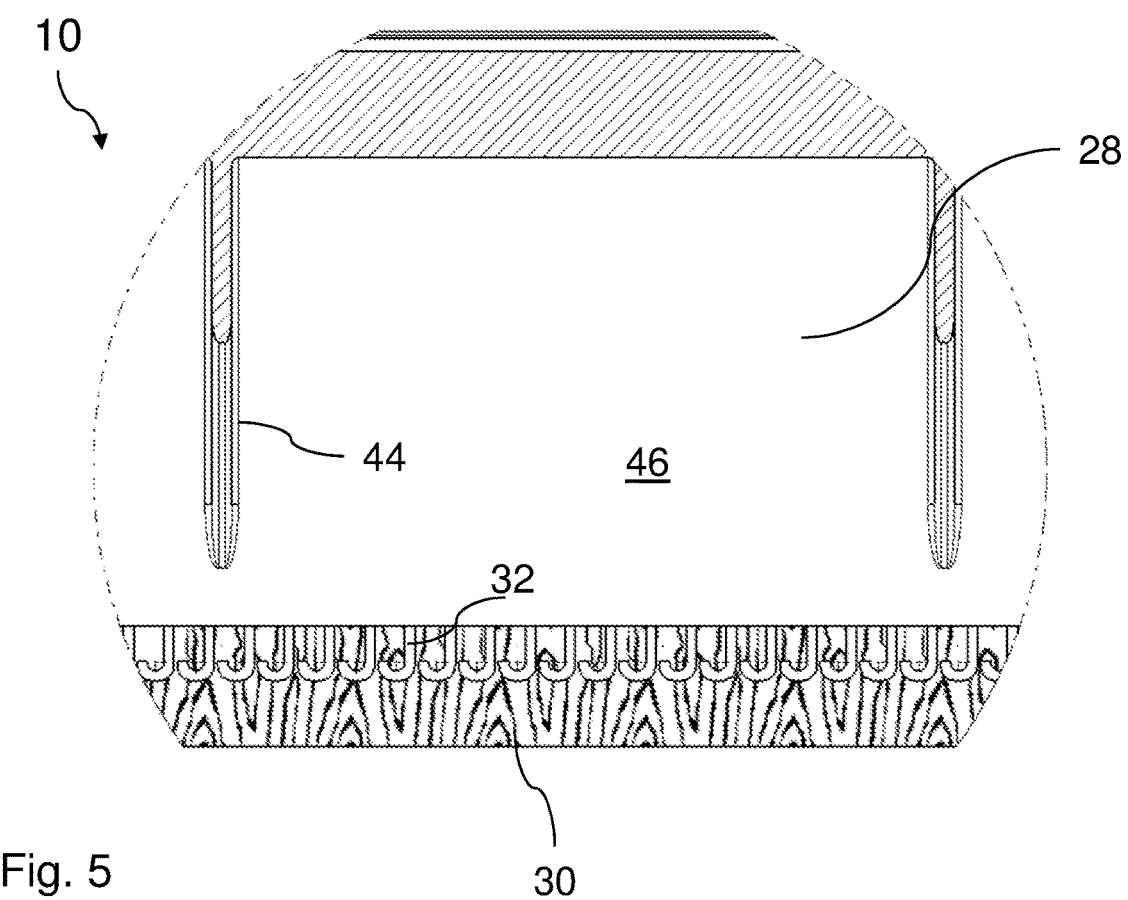
FIG. 5 is an enlarged side view of the filter element of FIG. 4 with details of the fastening elements in the form of hook and loop fastener hooks with attached pre-separator.

FIG. 5 shows an enlarged side view of the filter element 10 of FIG. 4 with details of the fastening elements 32 in the form of hook and loop fastener hooks with attached pre-separator 30. The fastening elements 32 are embodied as part of a hook and loop fastener, in particular as hook and loop fastener hooks. The pre-separator 30, embodied, for example, as a nonwoven, can thus be hooked as a counter member of a hook and loop fastener in these hook and loop fastener hooks; this ensures for the operation of the filter element 10 a reliable and permanent connection between frame 28 (FIG. 4) and pre-separator 30. When exchanging the filter element 10, the pre-separator 30 can still be removed again and exchanged.

In FIG. 5, reinforcement ribs 44 can also be seen clearly which serve for reinforcement of the side faces 46 of the frame 28.

Figure 6:
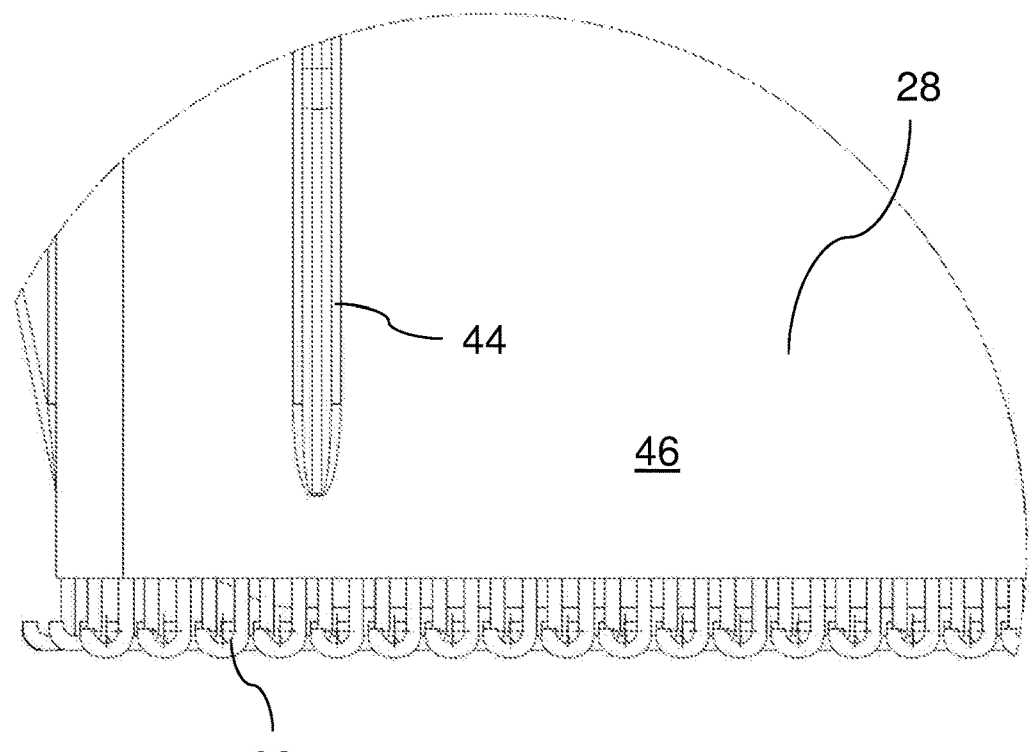
FIG. 6 is an enlarged side view of the filter element of FIG. 4 with details of the fastening elements in the form of hook and loop fastener hooks without pre-separator.

In FIG. 6, an enlarged side view of the filter element 10 of FIG. 4 with details of the fastening elements 32 in the form of hook and loop fastener hooks is illustrated without pre-separator 30. In this detail illustration, the shape of the hook and loop fastener hooks, which can be produced in an injection molding process together with the frame 28 as a one piece component, can be seen clearly. Such a shape can be produced in an injection mold. The finished component can also be removed from the mold after the injection process. Alternatively, the fastening elements 32 can also have a mushroom shape.

Figure 7:
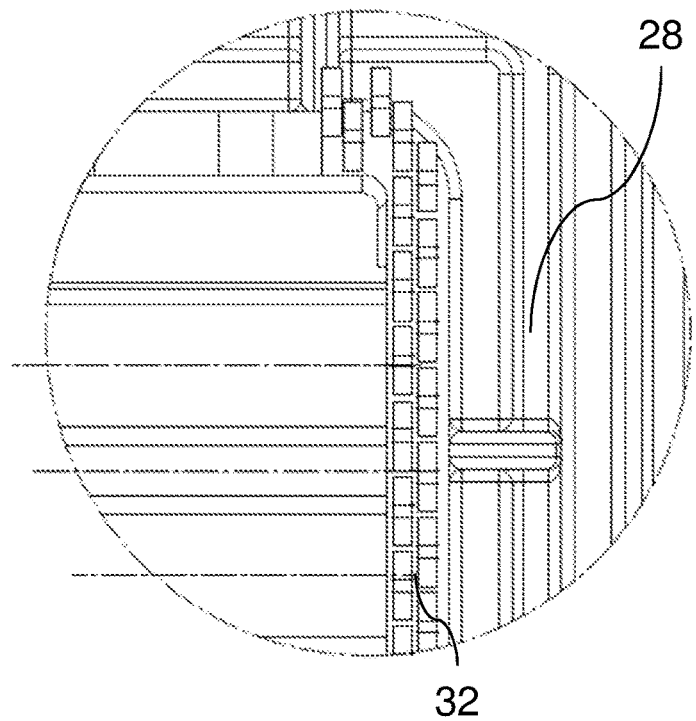
FIG. 7 is a plan view onto the fastening elements in the form of hook and loop fastener hooks according to an embodiment of the invention.

FIG. 7 shows a plan view of the fastening elements 32 in the form of hook and loop fastener hooks according to an embodiment of the invention. In the embodiment illustrated in FIG. 7, a two-row arrangement of hook and loop fastener hooks is selected as sufficient for a permanent attachment of the pre-separator 30.

Figure 8:
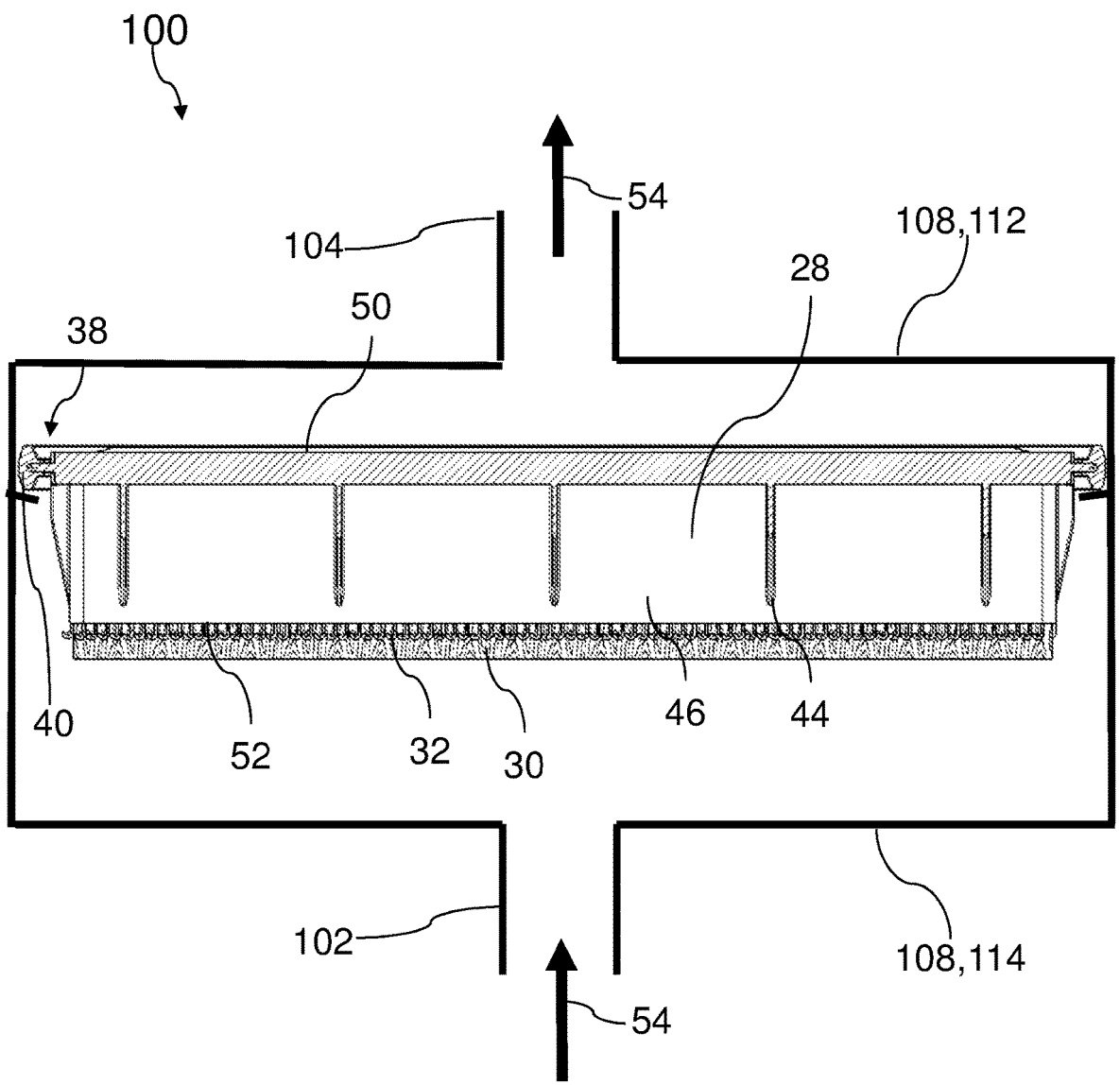
FIG. 8 is a schematic section illustration of a filter system according to an embodiment of the invention.

FIG. 8 shows a schematic section illustration of a filter system 100 according to an embodiment of the invention. The filter system 100 for filtering a fluid with a filter element 10 comprises an exchangeable filter element 10 arranged in a filter housing 108 of the filter system. The filter element 10 provides a filter bellows 12 and a pre-separator 30 for common exchange. The filter bellows 12 is injection-molded around by plastic material in the form of a frame 28 so that the end edge faces 20a, 20b are sealed. The pre-separator 30 is fastened with fastening elements 32 arranged at the frame 28. The fastening elements 32 are formed together with the frame 28 as one piece. The fastening elements 32 are embodied in this context as part of a hook and loop fastener, in particular as hook and loop fastener hooks. The filter system 100 serves, for example, for air filtration, in particular for air filtration of an internal combustion engine or as a filter for an interior of a vehicle.

The filter housing 108 with housing bottom part 114 and housing top part 112 is purely schematically illustrated with an inlet 102 for the fluid and an outlet 104 for the fluid. The flow direction 54 of the fluid is indicated with an arrow. The filter element 10 in the interior of the filter housing 108 is illustrated in side view and is sealed with the seal 40 at the end face 38 of the frame 28 circumferentially relative to the filter housing 108 so that raw side 52 and clean side 50 are reliably separated from each other. The pre-separator is arranged upstream of the raw side 52 of the filter bellows 12, embedded by injection molding in the frame 28, in order to effect a pre-separation of large dirt particles of the fluid.

What is claimed is:

1. A filter element for filtering a fluid, the filter element comprising:
    at least one filter bellows comprising
        a specified raw side and
        a specified clean side oppositely positioned relative to the specified raw side;
    the at least one filter bellows comprising
        a filter medium,
        wherein the filter medium is folded along fold edges in a zigzag shape to folds,
        wherein the folds extend between oppositely positioned end edges of the at least one filter bellows, and
        wherein the at least one filter bellows comprises parallel extending end edge faces at oppositely positioned end faces;
    at least one pre-separator embodied as a flat mat and arranged at the raw side of the at least one filter bellows;
    a frame that is injection-molded from plastic material around the at least one filter bellows and seals the end edge faces;
    wherein at side faces of the frame, the frame forms hook fasteners on a raw side edge of the side faces, the hook fasteners formed in one piece together the frame and of the same material as the frame, the hook fasteners formed directly on the raw side edge of the side faces and projecting outwardly from the side faces;
    wherein the end edges of the at least one filter bellows are embedded into the frame, embedded into material of the frame, the embedded frame material sealing the end edges of the at least one filter bellows;

wherein the hook fasteners of the frame engage into material of the flat mat of the pre-separator, fastening the pre-separator onto frame on the raw side of the at least one filter bellows.

2. The filter element according to claim 1, wherein the hook fasteners of the frame are a part of a hook and loop fastener, engaging material of the pre-separator to fasten the pre-separator onto the frame.

3. The filter element according to claim 1, wherein the at least one pre-separator is configured to be exchanged together with the filter element.

4. The filter element according to claim 1, wherein the at least one pre-separator is an activated carbon medium.

5. The filter element according to claim 1, wherein the frame and the filter medium are comprised of the same material.

6. The filter element according to claim 1, further comprising
a circumferential seal arranged on an end face of the frame.

7. The filter element according to claim 1, wherein the frame comprises at least one reinforcement stay extending across the fold edges of the zig-zag shaped folds in an interior of the frame, the at least one reinforcement stay arranged between the side faces of the frame and extending transverse to the folds.

8. A filter system for filtering a fluid comprising:
a filter housing;
a filter element comprising:
  at least one filter bellows comprising
    a specified raw side and
    a specified clean side oppositely positioned relative to the specified raw side,
  wherein the at least one filter bellows comprises a filter medium,
  wherein the filter medium is folded along fold edges in a zigzag shape to folds,
  wherein the folds extend between oppositely positioned end edges of the at least one filter bellows, and
  wherein the at least one filter bellows comprises parallel extending end edge faces at oppositely positioned end faces;
at least one pre-separator embodied as a flat mat and arranged at the raw side of the at least one filter bellows;
a frame that is injection-molded from plastic material around the at least one filter bellows and seals the end edge faces,
wherein at side faces of the frame, the frame forms hook fasteners on a raw side edge of the side faces, the hook fasteners formed in one piece together the frame and of the same material as the frame, the hook fasteners formed directly on the raw side edge of the side faces and projecting outwardly from the side faces;
wherein the end edges of the at least one filter bellows are embedded into the frame, embedded into material of the frame, the embedded frame material sealing the end edges of the at least one filter bellows;
wherein the hook fasteners of the frame engage into material of the flat mat of the pre-separator, fastening the pre-separator onto frame on the raw side of the at least one filter bellows
wherein the filter element is exchangeably arranged in the filter housing,
wherein the at least one filter bellows and the at least one pre-separator are configured to be exchanged together.

9. The filter system according to claim 8, wherein the hook fasteners of the frame are a part of a hook and loop fastener, engaging material of the pre-separator to fasten the pre-separator onto the frame.

10. The filter system according to claim 8 embodied as an air filter of an internal combustion engine.

11. The filter system according to claim 8 embodied as a filter for an interior of a vehicle.

* * * * *